March 26, 1957 — H. A. LOEBENSTEEN — 2,786,296
TROLLING TACKLE
Filed Aug. 21, 1953 — 2 Sheets-Sheet 1
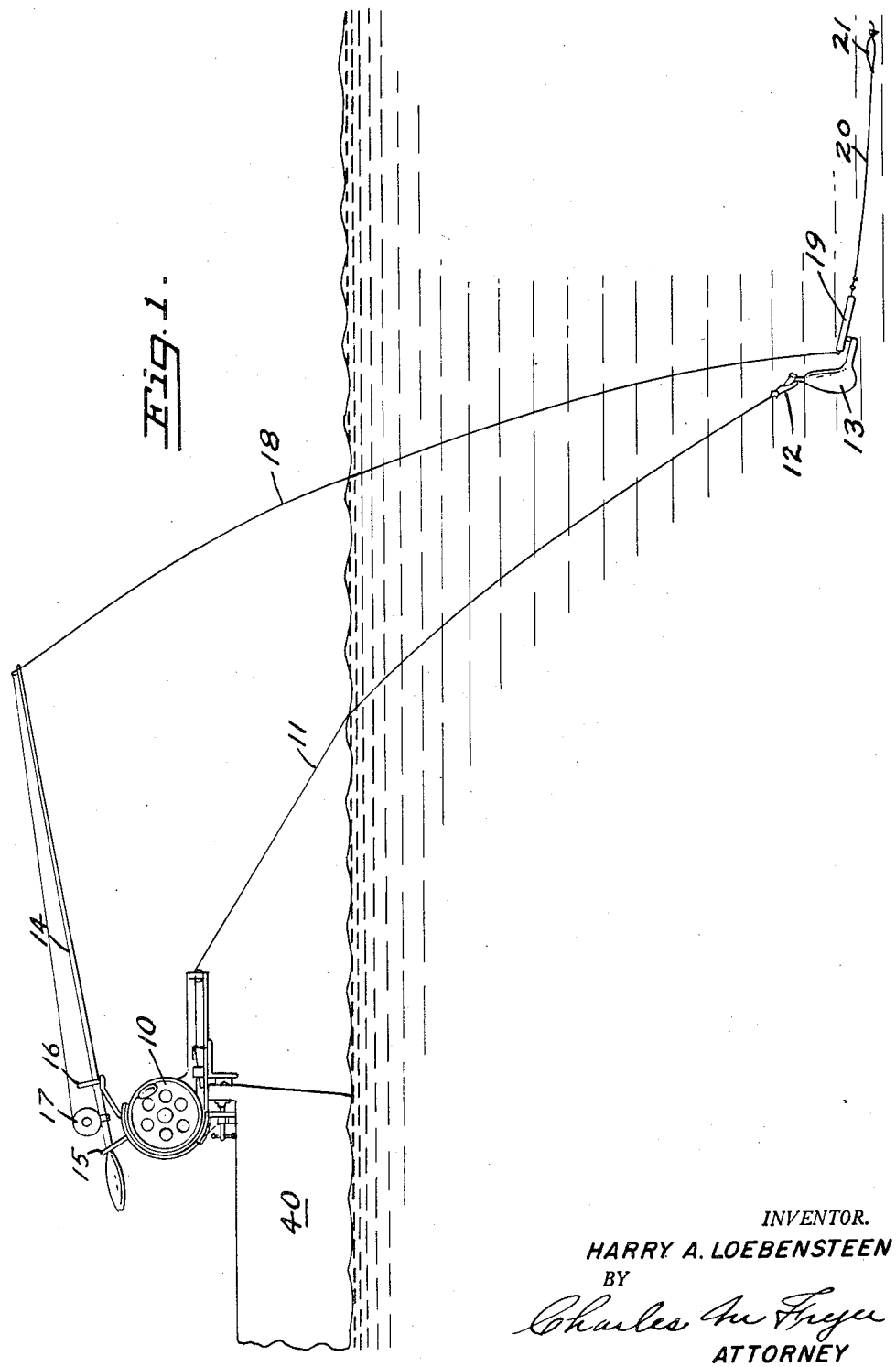
INVENTOR.
HARRY A. LOEBENSTEEN
BY
Charles M. Fryer
ATTORNEY

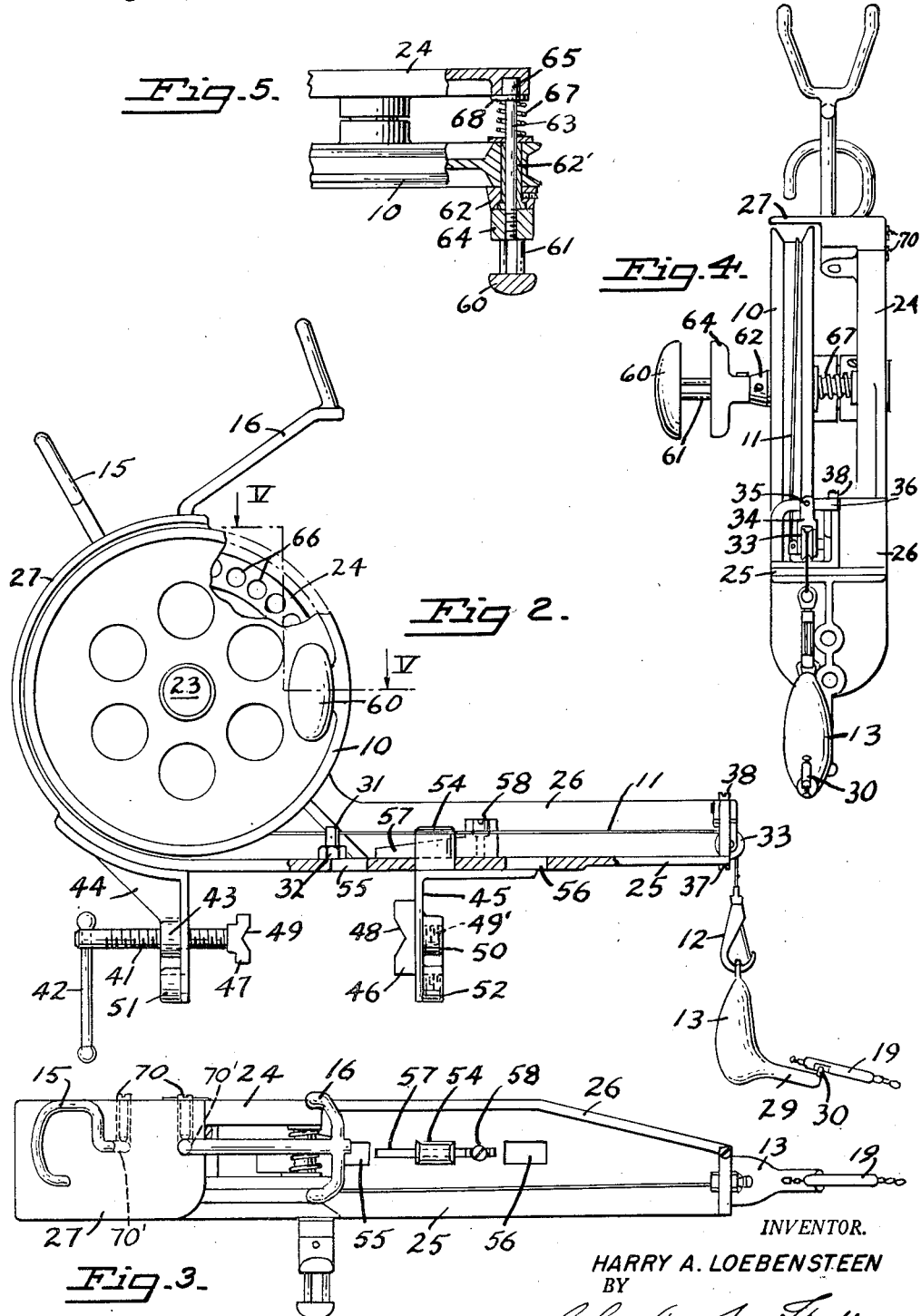

2,786,296

TROLLING TACKLE

Harry A. Loebensteen, San Francisco, Calif.

Application August 21, 1953, Serial No. 375,794

6 Claims. (Cl. 43—43.12)

This invention relates to fishing tackle and particularly to tackle for trolling where a sinker is employed to maintain the bait or lure at a desired depth below the surface of the water.

It is conventional practice in deep trolling for various types of fish to employ a sinker which is attached to the fishing line through the medium of a sinker release. This release includes a spring latch mechanism and when a fish is hooked the pull on the line or leader between the hook and the latch releases the latch and the sinker falls away so that the fish can be played and taken without the encumbering weight of the sinker on the line. One of the disadvantages of this practice is that the sinker is lost each time a fish is hooked, and many times when a fish bites without being hooked or when the hook becomes fouled with an underwater object. Another disadvantage is that relatively heavy tackle must be used to support the sinker when lighter tackle is desired for playing the fish after the sinker is dropped.

It is the object of the present invention to provide improved trolling tackle which includes a separate reel and line to carry a sinker, and means for attaching a conventional fishing line to the sinker in a manner to permit release of the sinker from the fishing line while the sinker remains supported and retrievable by the sinker line.

Other objects of the invention reside in the provision of features in the sinker and sinker reel to facilitate their use and handling, and these features will be set forth in detail in the following description and by reference to the accompanying drawings.

In the drawings:

Fig. 1 is a schematic view in side elevation of the trolling tackle of the present invention illustrated as secured to the rear end of a boat, and showing the manner in which the same is used;

Fig. 2 is an enlarged view in side elevation of the trolling tackle with portions broken away;

Fig. 3 is a plan view of the tackle shown in Fig. 2;

Fig. 4 is a front elevation of the same; and

Fig. 5 is a fragmentary detail partially in section on the line V—V of Fig. 2.

As illustrated in Fig. 1, the invention consists generally of a reel 10 for a sinker line 11 which has a snap 12 on its end for engagement with a sinker 13. A conventional fishing pole is shown at 14 as being supported in brackets 15 and 16 mounted adjacent the reel 10 in a manner presently to be described. The pole 14 is equipped with a conventional reel 17 for containing a line 18 which leads from the end of the pole. This line is connected with a sinker release 19 of conventional construction, such as shown in the patent to Darling No. 1,296,370, dated March 4, 1919; and a leader 20 connected with the opposite end of the sinker release carries a lure or bait 21. The sinker release 19 is also connected with the sinker 13 through its latch mechanism and since this sinker release is of conventional construction, it is not herein disclosed in detail.

In operation when a fish takes the bait 21 and is hooked so as to impart a substantial pull on the leader 20, the sinker release 19 is actuated to release the sinker 13 enabling the fisherman to play and land the fish with the pole 14 and line 18 which is entirely free of the sinker. Meanwhile the sinker is retained on the sinker line 11 and can be retrieved by the reel 10 after the fish is landed or during the time the fish is being played, so that the tackle may again be arranged and lowered in the manner illustrated in Fig. 1.

Details of construction of the device of this invention are shown in Figs. 2 to 5, inclusive, wherein the reel 10 is illustrated as rotatable upon a shaft 23 supported by and extending from a disc-like member 24. This member 24 is supported by and preferably formed integrally with an elongated base 25 which extends forwardly of the reel and has an upstanding flange 26 along one side thereof. The base 25 is also preferably extended and curved upwardly as illustrated at 27 to serve as a guard plate or cover for the rear half of the reel 10.

The line 11 is carried on and wound about the reel 10 so that upon rotation of the reel it may be taken in or played out as desired. The snap 12 on the end of the line is engageable with a ring projecting from the upper portion of the sinker 13 and the sinker, which is bulbous in character, is designed in such a manner that it tends to flow through the water with an extension 29 thereon in a trailing position. The terminal end of the extension 29 is provided with a ring 30 to which the sinker release 19 is secured.

Sinker line 11 is preferably of relatively strong material such as braided metal strands and is guided as it leaves the reel 10 through a fairlead in the nature of a perforated pin 31 screwed into the base 25 and secured in proper position of adjustment by a lock nut 32. Where the line 11 passes over the end of the base 25, it is trained over a sheave 33 pivoted in a sheave block 34 which is pivotally supported as at 35 on a bracket 36, for swinging about a horizontal axis. This bracket 36 is of angular shape so that it rises up from one side of the base and crosses over to join the upper edge of the flange 26. It is secured to the flange and base as by screws 37 and 38, respectively. The pivotal support 35 of the sheave block 34 enables the sheave to swing from side to side in the event of turning or rocking of the boat which tends to vary the angle of the sinker line as it leads off toward the water.

The sinker line reel is clamped to any convenient portion of the boat from which the fishing is done and in Fig. 1 it is illustrated as clamped to the transom of a small skiff or the like illustrated at 40. In order to enable convenient clamping to members of different sizes and shape, a jack screw 41 with a handle 42 thereon is threaded through a boss 43 in a bracket 44 which extends downwardly from the base of the reel structure. A bracket 45 is arranged in an opposed position to the bracket 44 and carries a jaw block 46 toward which a similar jaw block 47 on the jack screw 41 may be advanced. Both blocks 46 and 47 are providedd with V-like notches 48 and 49 respectively and since the blocks are capable of rotation, the notches or recesses therein may be aligned with any pipe, railing part, or similar article to which the reel structure may be clamped. The block 46 is screwed upon a stub shaft 49' in a boss 50 on the bracket 45 similar to the boss 43 on the bracket 44. Similar bosses 51 and 52 are arranged directly beneath the bosses 43 and 50 so that the jack screw and the block 46 may be lowered where greater stability is obtainable by securing them to some part that is spaced considerably below the edge of the boat.

In order to adapt the clamping means to railings or other parts of various thicknesses, the bracket 45 is arranged to be disposed in any one of several different positions or at various distances from the jack screw 41. To accomplish this, the bracket 45 has an upstanding rectangular part 54 fitting through a rectangular opening in the base 25. A similar opening is shown at 55 as closer to the jack screw and another opening at 56 as more distant therefrom. When the part 54 is located to project upwardly through any of the three openings shown, a wedge-like member 57 is inserted through a slot in the part 54 to retain it in position and a screw 58 extends through the wedge 57 and is engageable with the base 25 to prevent the wedge from slipping out of place.

It is desirable that the reel for the sinker line 11 be controllable with one hand to take in or let out on the sinker line and that it be readily secured in any desired position of adjustment. To this end a handle 60 is provided on the reel and this handle is supported on spaced posts 61 preferably four in number. The posts terminate in a bushing 62 rotatably mounted on a sleeve 62' supported in the reel. A latch bolt 63 extends through and is rotatably supported in sleeve 62', and has a retracting handle 64 secured to its outer end; the handle 64 being slidably mounted on posts 61. Its inner end has a part 65 adapted to project into any one of a plurality of equally spaced holes shown at 66 in Fig. 2 arranged in a circular pattern on the reel support 24. A spring 67 encircles the latch bolt and is disposed between the inner side of the reel 10 and a collar 68 on the latch bolt. This spring tends to urge the latch bolt into one of the holes 66 to latch the reel against rotation.

When it is desired to rotate the reel, the handle 60 is grasped with one hand while two fingers of the same hand underlie the retractor handle 64. The handle 64 may thus easily be manipulated with the fingers to retract the latch bolt and enable the reel to be rotated in either direction with one hand, leaving the other hand free to manipulate the fishing pole 14 or its reel 17. Since both handle 60 and retractor handle 64 can turn in unison on their mountings, manipulation of the reel is facilitated when it is turned. When the rotation is discontinued and the retractor released, the latch bolt enters one of the holes 66 again to latch the reel. In this connection, the depth of sinker 13 can be readily controlled by the number of revolutions the reel is turned.

To enable the pole 14 to be supported adjacent the sinker reel in a convenient position, the brackets 15 and 16 are connected directly with the frame which supports the reel. The brackets are made of round bar stock conveniently shaped as shown for supporting a fishing pole and each bracket is mounted in a socket hole 70' drilled in the frame of the reel. In order to enable the pole to assume a position at an angle to either side of the sinker line reel frame, the brackets may be twisted in their sockets and each bracket is normally held against such twisting movement by a set screw such as indicated at 70 in Figs. 3 and 4. These set screws are shown as provided with conventional screw driver slots but may be of the recessed type so that they do not project beyond the surface of the reel frame if desired.

With the trolling tackle herein illustrated, a weight of any desired size or type may be employed and its distance beneath the surface of the water may be accurately regulated. Since the weight is not supported by the fishing line itself, a light weight line and pole may be employed to add to the sport of playing and taking the fish. Furthermore, the sinker though readily released when the fish strikes the bait is not lost but is safely carried at the end of the sinker line by which it may be retrieved after the fish has been landed.

I claim:

1. In trolling tackle, the combination comprising a fishing line, a sinker, a sinker release device connecting said sinker to said fishing line, a sinker line secured to the sinker for retrieving the sinker when it is released from the fishing line by said device, a reel for the sinker line, means to secure the reel in an operative position on a boat, and means to support a fishing pole for said fishing line in a selected position relative to the reel.

2. In trolling tackle, the combination comprising a fishing line, a sinker, a sinker release device connecting said sinker to said fishing line, a sinker line secured to the sinker for retrieving the sinker when it is released from the fishing line by said device, a reel for the sinker line, means to secure the reel in an operative position on a boat, and means to support a fishing pole in a selected position relative to the reel, said last means including spaced brackets pivotally connected with respect to the sinker reel whereby they may be adjusted to support the pole at different angles.

3. In trolling tackle, a reel structure including a reel for carrying a sinker retrieving line, means on said reel structure for supporting a fishing line pole, a sinker, a fishing line connected to said pole including a sinker release device, means on said sinker at one location providing detachable connection to said sinker release device, and means at another location on said sinker providing connection thereof with said sinker retrieving line, said sinker release device being adapted for detachment from said sinker by a fish caught on the fishing line whereby the sinker will remain attached to said sinker retrieving line and can be recovered by reeling in said sinker retrieving line.

4. In trolling tackle, a frame, a sinker line reel, journalled on said frame, one hand manipulatable means for turning said reel and locking the same to said frame, means on said frame for guiding a sinker line from said reel, means on said frame for detachably mounting the same on a support, and bracket means on said frame above said sinker line guiding means for supporting on said frame a fishing line pole having another reel for a fishing line attached thereto.

5. In trolling tackle which includes a fishing line, a sinker, a sinker release device connecting said sinker to said fishing line, a sinker line secured to the sinker for retrieving the sinker when it is released from the fishing line by said device, a frame, means on said frame for detachably securing the same to a support, a reel for said sinker line journalled on said frame, one hand manipulatable means for turning said reel and locking the same to said frame, means on said frame for guiding the sinker line from said reel, and adjustable bracket means on said frame for supporting a fishing pole for said fishing line in selected position relative to said reel.

6. The trolling tackle of claim 5 in which said bracket means is located above said sinker line guiding means.

References Cited in the file of this patent

UNITED STATES PATENTS

| | | |
|---|---|---|
| 35,476 | Roys | June 3, 1862 |
| 46,453 | Decker | Feb. 21, 1865 |
| 488,678 | Leprohon | Dec. 27, 1892 |
| 787,055 | Schreidt | Apr. 11, 1905 |
| 1,296,370 | Darling | Mar. 4, 1919 |
| 2,121,279 | Beck | June 21, 1938 |
| 2,211,278 | LeFebvre | Aug. 13, 1940 |
| 2,238,127 | Nissen | Apr. 15, 1941 |
| 2,562,054 | Mathieu | July 24, 1951 |
| 2,580,130 | Rowdon | Dec. 25, 1951 |
| 2,586,170 | Lawrenz | Feb. 19, 1952 |
| 2,593,716 | Allen | Apr. 22, 1952 |
| 2,602,618 | Cohen | July 8, 1952 |
| 2,735,212 | Baum | Feb. 21, 1956 |